US012487639B2

(12) United States Patent
Zheng

(10) Patent No.: US 12,487,639 B2
(45) Date of Patent: Dec. 2, 2025

(54) ROTATING SHAFT MECHANISM AND FOLDABLE DISPLAY DEVICE INCLUDING THE SAME

(71) Applicant: Wuhan China Star Optoelectronics Semiconductor Display Technology Co., Ltd., Hubei (CN)

(72) Inventor: Bingwen Zheng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/275,057

(22) PCT Filed: May 16, 2023

(86) PCT No.: PCT/CN2023/094518
§ 371 (c)(1),
(2) Date: Jul. 31, 2023

(87) PCT Pub. No.: WO2024/198059
PCT Pub. Date: Oct. 3, 2024

(65) Prior Publication Data
US 2025/0085745 A1 Mar. 13, 2025

(30) Foreign Application Priority Data
Mar. 28, 2023 (CN) .......................... 202310337333.2

(51) Int. Cl.
*G06F 1/00* (2006.01)
*G06F 1/16* (2006.01)
*G09F 9/30* (2006.01)
*H04M 1/02* (2006.01)

(52) U.S. Cl.
CPC ............ *G06F 1/1641* (2013.01); *G09F 9/301* (2013.01); *H04M 1/0237* (2013.01)

(58) Field of Classification Search
CPC ...... G06F 1/1641; G06F 1/1681; G09F 9/301; H04M 1/0237; H04M 1/02; H04M 1/0202; F16C 11/04
See application file for complete search history.

(56) References Cited

U.S. PATENT DOCUMENTS 12,256,508 B2 * 3/2025 Zhang ................... G06F 1/1681
2023/0403349 A1 * 12/2023 Chen ..................... G06F 1/1641
2024/0074075 A1 * 2/2024 Kim ....................... G06F 1/1616

* cited by examiner

*Primary Examiner* — Ping Y Hsieh

(57) ABSTRACT

Embodiments of the disclosure provides a rotating shaft mechanism and a foldable display device. The rotating shaft mechanism includes a supporting frame, a synchronization slider, a fixing piece, and a cam assembly. A sliding guide rail is rotatably connected to the synchronization slider. When the fixing piece rotates, the sliding guide rail provides a driving force for the synchronization slider, enabling the synchronization slider to slide in an accommodating cavity in a direction parallel to an axis of the supporting frame, and driving the cam assembly to slide relatively, which achieves the bending of the foldable display device, simplifies the structure of the rotating shaft mechanism, and improves the bending effect.

20 Claims, 10 Drawing Sheets

ROTATING SHAFT MECHANISM AND FOLDABLE DISPLAY DEVICE INCLUDING THE SAME

RELATED APPLICATIONS

This application is a National Phase of PCT Patent Application No. PCT/CN2023/094518 having International filing date of May 16, 2023, which claims the benefit of priority of China Patent Application No. 202310337333.2 filed on Mar. 28, 2023. The contents of the above applications are all incorporated by reference as if fully set forth herein in their entirety.

TECHNICAL FIELD

The disclosure relates to the field of display, in particular to a rotating shaft mechanism and a foldable display device including the same.

BACKGROUND

With the development of manufacturing technology of display panels, users have put forward higher requirements for the display effect and the comprehensive performance of the display panels and display devices including the same.

As a high-end display product, foldable terminal products are gradually launched by various terminal manufacturers because they can be bent to a certain extent, and the size and shape of the product can be changed or reduced in the process of bending, effectively reducing the size of the foldable terminal products and making them more convenient to carry or use. In order to realize the bending function of the device, the foldable terminal products are generally realized by a bendable rotating shaft. An existing rotating shaft basically includes a track realization mechanism, a synchronization mechanism, or a torque realization mechanism, or combination(s) of these mechanisms, which leads to more rotating shaft components, larger weight, complex assembly process, and unsatisfactory rotation effect in the existing rotating shaft mechanism, which is not conducive to the simplification of the structure of the display device including the rotating shaft mechanism and the requirements for light and thin settings.

Therefore, solutions need to propose to solve the above-mentioned problem(s) in the related art.

SUMMARY

Based on the above, a rotating shaft mechanism in a foldable display device in the related art has a complex structure and the rotation effect of the rotating shaft structure is not ideal, which is not conducive to further improving of the comprehensive performance of the foldable display device.

In order to solve the above-mentioned problem, embodiments of the disclosure provide a rotating shaft mechanism and a foldable display device to effectively improve the problem(s) of complex internal structures of the rotating shaft mechanism and an unsatisfactory rotation effect of the foldable display device in the related art.

To solve the above-mentioned technical problem(s), embodiments of the disclosure provide a rotating shaft mechanism, which may include:

a supporting frame, where an accommodating cavity may be disposed in the supporting frame;

a synchronization slider slidably disposed in the accommodating cavity;

a fixing piece rotatably connected to the synchronization slider; and a cam assembly correspondingly disposed on the supporting frame and the synchronization slider;

where when the fixing piece rotates, the fixing piece may provide a driving force for the synchronization slider, enabling the synchronization slider to slide in the accommodating cavity in a direction parallel to an axis of the supporting frame, and driving the cam assembly disposed on the synchronization slider to slide on the cam assembly disposed on the supporting frame; and where the cam assembly may include a first cam and a second cam; the first cam may be correspondingly disposed on an inner side wall of the accommodating cavity and face the synchronization slider; and the second cam may be disposed on the synchronization slider and face the inner side wall of the accommodating cavity, and both of a climbing angle at a position where a protrusion part of the first cam is located and a climbing angle at a position where a protrusion part of the second cam is located may range from 35 degrees to 75 degrees.

According to an embodiment of the disclosure, an outer contour surface of the first cam may be in contact with an outer contour surface of the second cam, and when the rotating shaft mechanism rotates, the second cam may slide on the outer contour surface of the first cam.

In a second aspect, embodiments of the disclosure further provide a rotating shaft mechanism, which may include:

a supporting frame, where an accommodating cavity may be disposed in the supporting frame;

a synchronization slider slidably disposed in the accommodating cavity;

a fixing piece rotatably connected to the synchronization slider; and a cam assembly correspondingly disposed on the supporting frame and the synchronization slider;

where when the fixing piece rotates, the fixing piece may provide a driving force for the synchronization slider, enabling the synchronization slider to slide in the accommodating cavity in a direction parallel to an axis of the supporting frame, and driving the cam assembly disposed on the synchronization slider to slide on the cam assembly disposed on the supporting frame.

According to an embodiment of the disclosure, the cam assembly may include a first cam and a second cam; and where the first cam may be correspondingly disposed on an inner side wall of the accommodating cavity and face the synchronization slider, and the second cam may be disposed on the synchronization slider and face the inner side wall of the accommodating cavity.

According to an embodiment of the disclosure, the second cam may include a protrusion part, an aligning part, and an aligning hole; and where the protrusion part may be disposed on the aligning part, and the aligning hole may be disposed on a side wall of the aligning part.

According to an embodiment of the disclosure, a protrusion part of the first cam may be in contact with the protrusion part of the second cam, and the protrusion part of the first cam and the protrusion part of the second cam form a contact area; and where during a process of the rotating shaft mechanism rotating from a first moment to a second moment, an area of the contact area at the first moment may be different from an area of the contact area at the second moment.

According to an embodiment of the disclosure, an outer contour surface of the first cam may be in contact with an outer contour surface of the second cam, and when the rotating shaft mechanism rotates, the second cam may slide on the outer contour surface of the first cam.

According to an embodiment of the disclosure, the synchronization slider may be configured to have a mounting groove, and a connection member may be disposed in the mounting groove; and
where the second cam may be correspondingly disposed on the connection member, and a protrusion part of the second cam may face the first cam.

According to an embodiment of the disclosure, the synchronization slider may include an elastic member disposed on the connection member and used to provide a recovery elastic force for the second cam.

According to an embodiment of the disclosure, the synchronization slider may include at least one notch; the first cam may be correspondingly disposed in the notch; and a width of the notch is greater than a height of the first cam in a direction parallel to a top of the first cam.

According to an embodiment of the disclosure, the synchronization slider may include a sliding guide groove; the sliding guide groove may include a first sliding guide groove and a second sliding guide groove; and a sliding guide rail may be disposed on the fixing piece; and
where the sliding guide rail may be disposed in the sliding guide groove in a rotating form, and configured to provide a driving force for the synchronization slider during a rotation process.

According to an embodiment of the disclosure, a first included angle may be formed between an extension direction of a central axis of the first sliding guide groove and an extension direction of a central axis of the synchronization slider, and a second included angle may be formed between an extension direction of a central axis of the second sliding guide groove and the extension direction of the central axis of the synchronization slider; and
where both of the first included angle and the second included angle may range from 40 degrees to 50 degrees.

According to an embodiment of the disclosure, the sliding guide groove may include a first opening part, a second opening part, and a third opening part; and
where the first opening part may be disposed close to an edge of the synchronization slider, and the second opening part may be disposed between the first opening part and the third opening part.

According to an embodiment of the disclosure, both of an opening width of the first opening part and an opening width of the third opening part may be greater than an opening width of the second opening part.

According to an embodiment of the disclosure, a sliding guide rail may be disposed on the fixing piece, and the sliding guide rail may be disposed from a side surface of the fixing piece to a position where a central axis of the fixing piece is located in a width direction.

According to an embodiment of the disclosure, both of the sliding guide groove and the sliding guide rail may be provided in a spiral form, and the sliding guide rail may be slidably disposed in the sliding guide groove; and when the rotating shaft mechanism rotates, the sliding guide rail may slide in the sliding guide groove and drive the synchronization slider to move along an axis of the supporting frame.

According to an embodiment of the disclosure, a spiral angle of the sliding guide rail may range from 30 degrees to 60 degrees.

According to an embodiment of the disclosure, when the rotating shaft mechanism is in a flattened state, an end of the sliding guide rail away from an edge of the synchronization slider may be disposed in the third opening part of the sliding guide groove, and the second cam may be disposed on a side wall of a protrusion part of the first cam.

In a third aspect, embodiments of the disclosure further provide a foldable display device, which may include:
a first middle frame;
a second middle frame disposed at a side of the first middle frame;
the rotating shaft mechanism according to the above-mentioned embodiments of the disclosure, disposed between the first frame and the second middle frame, where the first frame may be connected to the second middle frame through the rotating shaft mechanism; and
a flexible display panel covering the first middle frame, the second middle frame, and the rotating shaft mechanism.

According to an embodiment of the disclosure, the rotating shaft mechanism may include a first rotating shaft mechanism and a second rotating shaft mechanism; where the first rotating shaft mechanism may be connected to a side of the first middle frame and the second middle frame at a same side as the first rotating shaft mechanism, and the second rotating shaft mechanism may be connected to a side of the first middle frame and the second middle frame at an opposite side; and
where the foldable display device further may include a supporting plate disposed between the first rotating shaft mechanism and the second rotating shaft mechanism, and the flexible display panel may be disposed on the supporting plate.

BENEFICIAL EFFECTS

In view of foregoing, beneficial effects of the embodiments of the disclosure are as follows.

The beneficial effects of the embodiments of the disclosure are as follows: compared to the existing art, the embodiments of the disclosure provide a rotating shaft mechanism and a foldable display device including the same, and the rotating shaft mechanism may include a supporting frame, a synchronization slider, a fixing piece, and a cam assembly; the supporting frame may include an accommodating groove, and the synchronization slider may be disposed in the accommodating groove; the synchronization slider may include a sliding guide groove, and the fixing piece may be correspondingly disposed in the sliding guide groove and rotatably connected to the synchronization slider. When the fixing piece rotates relative to the synchronization slider, the synchronization slider may move in the accommodating cavity along an axis of the supporting frame, and the cam assembly disposed on the synchronization slider may slide on the cam assembly disposed on the supporting frame. The bending of a display panel can be achieved by limiting the motion of the synchronization slider through the cam assembly. Furthermore, the embodiments of the disclosure can effectively simplify the structure of the rotating shaft mechanism, and improve the bending effect and the comprehensive performance of the foldable display device by designing the synchronization slider and the cam assembly.

DETAILED DESCRIPTION

The descriptions of the following embodiments refer to the attached drawings to illustrate the specific embodiments that may be implemented in the disclosure.

With the development of display technology, users have higher requirements for the performances and the display effect of display panels and display devices including the same.

Generally, a bending effect of a foldable display device may be achieved through a rotating shaft mechanism. However, structures and relative motion relationships of components in the rotating shaft mechanism of the existing art are complex, resulting in poor bending effect, which is not conducive to further improve the comprehensive performance of the foldable display panel and the foldable display device including the same.

Embodiments of the disclosure provide a rotating shaft mechanism and a foldable display device including the same to effectively improve the structural complexity of the rotating shaft mechanism in the existing art, enhance the bending effect of the foldable display panel, and effectively improve the comprehensive performance of the foldable display device.

Figure 1:
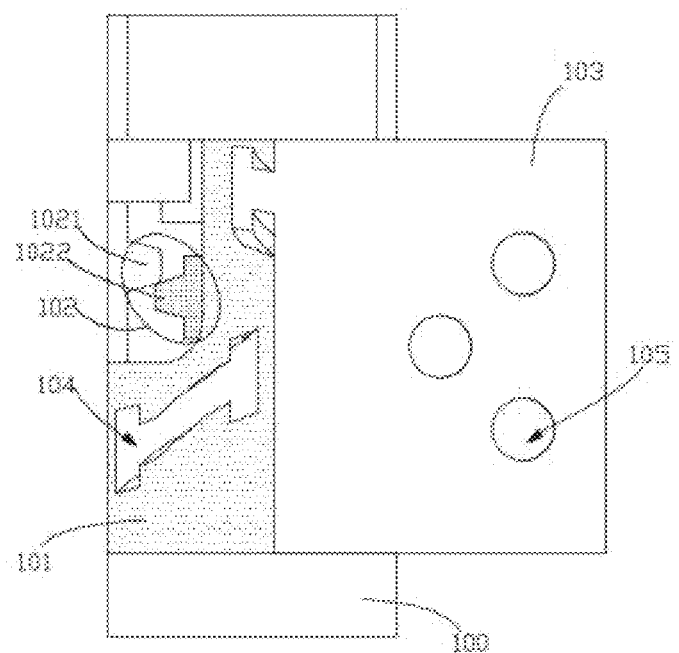
FIG. 1 is a schematic structural diagram of a rotating shaft mechanism according to an embodiment of the disclosure.

As shown in FIG. 1, it is a schematic structural diagram of a rotating shaft mechanism according to an embodiment of the disclosure. The rotating shaft mechanism includes a supporting frame 100, a synchronization slider 101, a cam assembly 102, and a fixing piece 103.

Specifically, the supporting frame 100 includes an accommodating cavity, and the synchronization slider 101 is disposed in the accommodating cavity. When the foldable display device is folded or bent, the synchronization slider 101 can move in the accommodating cavity.

Furthermore, in the design, the fixing piece 103 is disposed on the synchronization slider 101 and rotatably connected to the synchronization slider 101. That is, the fixing piece 103 can rotate relative to the synchronization slider 101. Optionally, in the design, a sliding guide groove may be provided on an upper surface of the synchronization slider 101. When the foldable display device is folded, the fixing piece 103 can rotate in the sliding guide groove to achieve folding and/or bending of the foldable display device.

In this embodiment of the disclosure, the rotating shaft mechanism further includes the cam assembly 102 disposed on the supporting frame 100 and the synchronization slider 101. For example, the cam assembly 102 is disposed on an inner side wall of the accommodating cavity of the supporting frame 100, such as, on two opposite inner side walls of the accommodating cavity. Meanwhile, the cam assembly 102 is further disposed on the synchronization slider 101 corresponding to the supporting frame 100. When the synchronization slider 101 in the rotating shaft mechanism moves along an axis of the supporting frame 100 under a driving force of the fixing piece 103, the cam assembly 102 disposed on the synchronization slider 101 can slide on the cam assembly 102 disposed on the supporting frame 100, limiting the sliding of the synchronization slider 101 through the cam assembly 102, and further ensuring the folding effect and the bending effect of the foldable display device.

Figure 2:
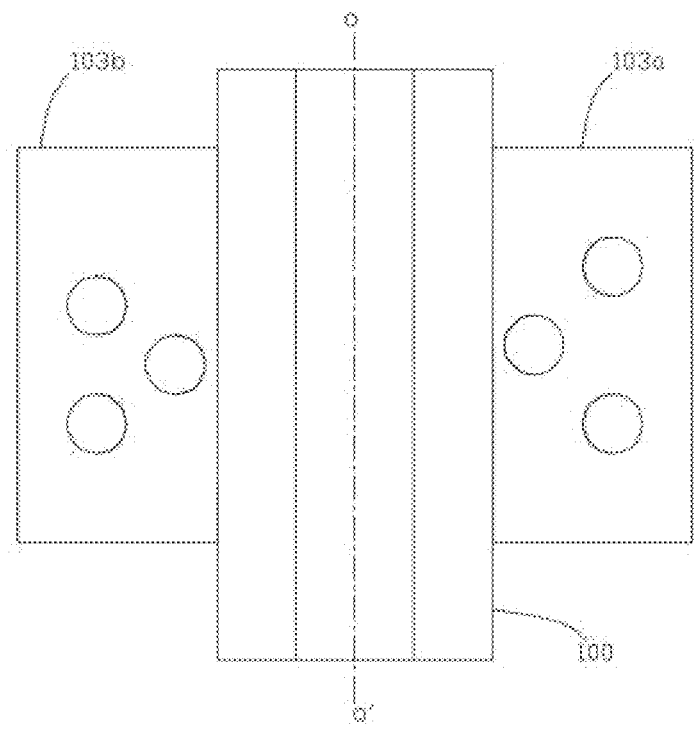
FIG. 2 is a schematic top view of a rotating shaft mechanism according to an embodiment of the disclosure.
Figure 3:
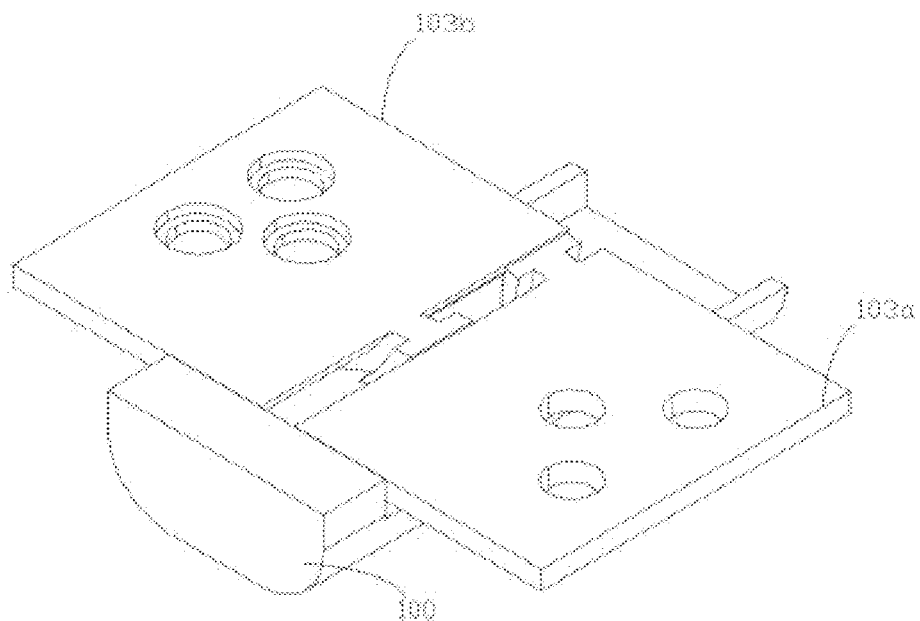
FIG. 3 is a schematic three-dimensional diagram of a rotating shaft mechanism according to an embodiment of the disclosure.

Furthermore, as shown in FIG. 2 and FIG. 3, FIG. 2 is a schematic top view of the rotating shaft mechanism according to the embodiment of the disclosure, and FIG. 3 is a schematic three-dimensional diagram of the rotating shaft mechanism according to the embodiment of the disclosure. Combining FIG. 1, FIG. 2, and FIG. 3, in this embodiment of the disclosure, the rotating shaft mechanism includes two fixing pieces 103, namely a first fixing piece 103a and a second fixing piece 103b.

Referring to FIG. 3 for details, in this embodiment of the disclosure, both of the first fixing piece 103a and the second fixing piece 103b are disposed on the synchronization slider 101. In the design, the first fixing piece 103a and the second fixing piece 103b are respectively disposed on two sides of a central axis OO' of the supporting frame 100. A gap is formed between the first fixing piece 103a and the second fixing piece 103b to prevent the interference between the first fixing piece 103a and the second fixing piece 103b during the rotation process, ensuring the normal rotation of the first fixing piece 103a and the second fixing piece 103b.

Figure 4:
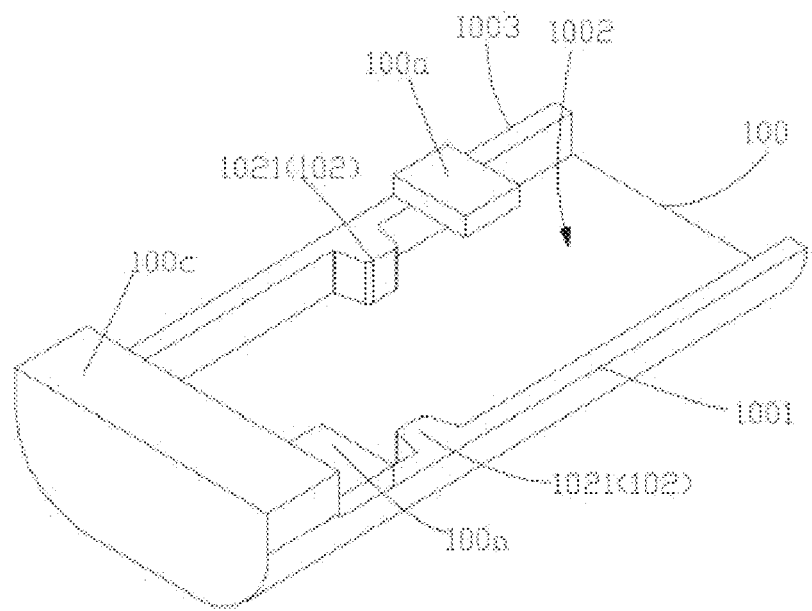
FIG. 4 is a schematic structural diagram of a supporting frame according to an embodiment of the disclosure.

As shown in FIG. 4, it is a schematic structural diagram of the supporting frame 100 according to the embodiment of the disclosure. In this embodiment of the disclosure, in the setting of the supporting frame 100, the supporting frame 100 includes an accommodating cavity 1002 disposed at a middle of the supporting frame 100. For example, a groove may be dug from a main part of the supporting frame 100 to form the accommodating cavity 1002 with a certain depth and a certain length. The supporting frame 100 includes a first side wall 1001 and a second side wall 1003 disposed on two opposite sides of the accommodating cavity 1002. The first side wall 1001 and the second side wall 1003 have the same heights and the same thicknesses, ensuring better symmetry of the supporting frame 100 to improve the comprehensive performance of the foldable device.

Furthermore, the supporting frame 100 further includes at least one block 100a disposed on the first side wall 1001 or the second side wall 1003. Because the synchronization slider 101 is disposed in the accommodating cavity 1002, the block 100a can limit the synchronization slider 101 to slide in the accommodating cavity 1002 during the sliding process of the synchronization slider 101, avoiding the abnormal operation of the foldable display panel caused by the synchronization slider 101 sliding out of the accommodating cavity 1002.

Meanwhile, in the setting of the block 100a, the block 100a in this embodiment of the disclosure is disposed close to the cam assembly 102 to ensure the blocking effect of the block 100a, further achieving a better blocking effect.

Furthermore, in this embodiment of the disclosure, in the setting of the cam assembly, the cam assembly may include at least one first cam 1021 and at least one second cam 1022. In some embodiments, the cam assembly may include multiple first cams 1021 and multiple second cams 1022. In the following embodiments, the cam assembly including two first cams 1021 and two second cams 1022 are taken for examples for description.

Specifically, the two first cams 1021 are disposed on the inner side wall of the accommodating cavity 1002 of the supporting frame 100. For example, the two first cams 1021 may be respectively disposed on the first side wall 1001 and the second side wall 1003, and face the synchronization slider. In the design, one of the two first cams 1021 on the first side wall 1001 and another of the two first cams 1021 on the second side wall 1003 may be misaligned, as shown in FIG. 4.

Meanwhile, in some embodiments, multiple first cams 1021 may be respectively disposed on the first side wall 1001 and the second side wall 1003 at intervals. In this embodiment of the disclosure, a force from the first cams 1021 may be applied on the synchronization slider 101 when the synchronization slider 101 slides in the accommodating cavity 1002, providing resistance force to the synchronization slider 101 and controlling the unfolding or folding of the foldable display device.

Furthermore, a lateral retaining wall 100c is provided on the supporting frame 100 and at a side of the accommodating cavity 1002. For example, the lateral retaining wall 100c may be disposed on an end of a side of the supporting frame 100, and disposed on the first side wall 1001 and the second side wall 1003. This embodiment of the disclosure can enable the end of the supporting frame to be flush with other mechanisms by designing the lateral retaining wall 100c.

Figure 5:
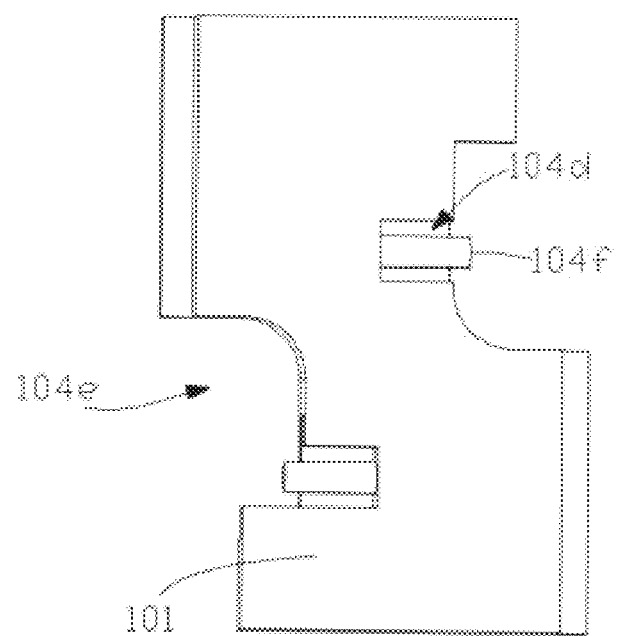
FIG. 5 is a schematic top view of a synchronization slider according to an embodiment of the disclosure.
Figure 6:
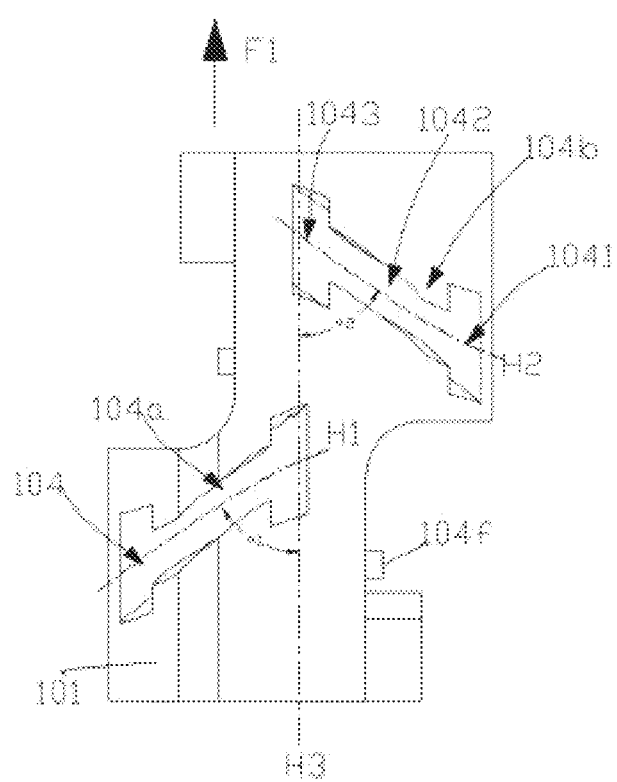
FIG. 6 is a schematic front view of a synchronization slider according to an embodiment of the disclosure.

In combination with the structural diagrams of the components in FIG. 1 to FIG. 4, referring to FIG. 5 and FIG. 6, FIG. 5 is a schematic top view of the synchronization slider according to the embodiment of the disclosure, and FIG. 6 is a front view of the synchronization slider according to the embodiment of the disclosure. In this embodiment of the disclosure, the synchronization slider 101 includes at least one sliding guide groove 104. In the following embodiments, taking two sliding guide grooves 104, namely a first sliding guide groove 104a and a second sliding guide groove 104b, for examples for description. A shape and a structure of the first sliding guide groove 104a can be the same as that of the second sliding guide groove 104b.

Specifically, in the setting of the two sliding guide grooves 104, the two sliding guide grooves 104 may be directly disposed on the synchronization slider 101. Optionally, each of the two sliding guide grooves 104 has a certain depth in the synchronization slider 101, but does not form a through hole in a thickness direction of the synchronization slider.

Meanwhile, in the setting of the first sliding guide groove 104a and the second sliding guide groove 104b, the first sliding guide groove 104a and the second sliding guide groove 104b are symmetrically disposed relative to a point at a central axis H3 of the synchronization slider 101. Optionally, in the setting of the first sliding guide groove 104a and the second sliding guide groove 104, both of the first sliding guide groove 104a and the second sliding guide groove 104 are obliquely disposed relative to the central axis H3 of the synchronization slider 101. For example, certain angles are respectively formed between the first sliding guide groove 104a and the central axis H3 of the synchronization slider 101, and the second sliding guide groove 104b and the central axis H3 of the synchronization slider 101, and the certain angles are not right angles.

Furthermore, in the setting of the two sliding guide grooves 104, each of the two sliding guide grooves may include a first opening part 1041, a second opening part 1042, and a third opening part 1043. The first opening part 1041 and the third opening part 1043 are openings of two sides of the sliding guide groove, and the second opening part 1042 is disposed between the first opening part 1041 and the third opening part 1043. The second opening part 1042 is a main sliding part of the sliding guide groove. Both of an opening width of the first opening part 1041 and an opening width of the third opening part 1043 are greater than an opening width of the second opening part 1042.

During the sliding process of the two fixing pieces in the two sliding guide grooves, each of the two fixing pieces mainly slides back and forth in a guiding groove part corresponding to the first opening part 1041, the second opening part 1042, and the third opening part 1043. Because the above-mentioned two sliding guide grooves are obliquely disposed relative to the central axis H3 of the synchronization slider 101, the two fixing pieces may apply a driving force on the synchronization slider 101 in an axial direction during the sliding process, so that the synchronization slider 101 can move back and forth in a direction of the driving force F1 under the action of the driving force F1, thereby achieving the folding function.

Furthermore, in the embodiment of the disclosure, both of a caliber of the first opening part 1041 and a caliber of the third opening part 1043 may be greater than a caliber of the second opening part 1042, so as to facilitate the installation of the fixing pieces and improve the sliding effect of the fixing pieces. Moreover, each of the two sliding guide grooves corresponding to the second opening part 1042 is disposed in a spiral shape. Referring to FIG. 6 for details, in the setting of the spiral structure, take the structure of the second sliding guide groove 104b for example, the second sliding guide groove 104b spirally rises from the first opening part 1041 at the bottom to the third opening part 1043 at the top. That is, a central axis H2 corresponding to the second sliding guide groove 104b is an arc, which is concave downwards to form the above-mentioned spiral structure. In this embodiment of the disclosure, a spiral angle of the spiral structure of each of the two sliding guide grooves ranges from 30 degrees to 60 degrees. Optionally, the spiral angle may be 45 degrees, 55 degrees, or designed according to actual needs, so that the driving force can be applied on the synchronization slider during the sliding process.

Specifically, at a side of the first sliding guide groove 104a close to the central axis H3 of the synchronization slider 101, a first included angle α1 is formed between the central axis H1 of the first sliding guide groove 104a and the central axis H3 of the synchronization slider. At a side of the second sliding guide groove 104b close to the central axis H3 of the synchronization slider 101, a second included angle α2 is formed between the central axis H2 of the second sliding guide groove 104b and the central axis H3 of the synchronization slider. In the embodiment of the disclosure, the first included angle α1 and the second included angle α2 may be the same. Optionally, both of the first included angle α1 and the second included angle α2 may range from 40 degrees to 50 degrees, such as 45 degrees. The spiral angles of the two sliding guide grooves can change by adjusting the first included angle α1 and the second included angle α2, so as to provide different sliding forces for the synchronization slider 101 and achieve various folding effects of the foldable display device.

Furthermore, in the embodiment of the disclosure, an included angle may further be formed between an extension line of the central axis H1 of the first sliding guide groove 104a and an extension line of the central axis H2 of the second sliding guide groove 104b. For example, the included angle may namely be a third included angle. Specifically, a value of the third included angle is twice a value of the first included angle α1 or a value of the second included angle α2. Optionally, the third included angle may be 80 degrees, 100 degrees, or the like, to achieve different relative position relationships of the two sliding guide grooves, and ensure a better folding effect of the foldable display device.

Referring to FIG. 5 for details, in the embodiment of the disclosure, in the setting of the synchronization slider 101 mentioned above, the synchronization slider 101 further includes at least one notch 104e disposed to correspond to the first cams 1021. Due to the arrangement of the two first cams 1021, the synchronization slider 101 includes two notches corresponding to the two first cams 1021. The two notches 104e are respectively disposed at two sides of the synchronization slider 101.

In the embodiment of the disclosure, an opening width of each of the two notches 104e is greater than a height of each of the two first cams 1021. Taking a direction parallel to a top of each of the two first cams, such as a horizontal direction, as a reference, the opening depth of each of the two notches 104e is a width in the horizontal direction, and the height of each of the two first cams is a height in the horizontal direction. Due to the fact that the synchronization slider needs to move back and forth in the supporting frame 100 during the rotation process of the rotating shaft mechanism, the design of the above-mentioned notches 104e can provide avoidance space for the cam assembly and ensure the normal motion of the cam assembly in the two notches 104e.

Figure 12:
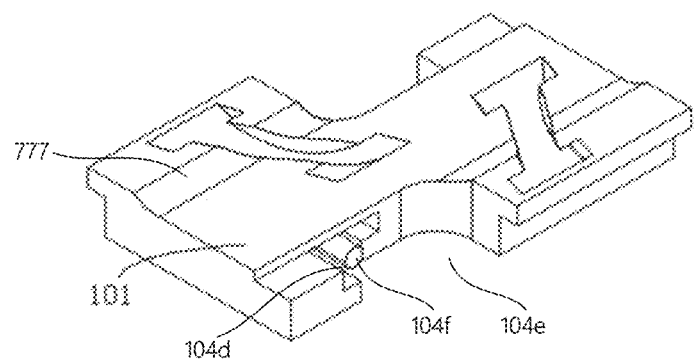
FIG. 12 is a schematic three-dimensional diagram of a synchronization slider according to an embodiment of the disclosure.

FIG. 12 is a schematic three-dimensional diagram of the synchronization slider according to the embodiment of the disclosure. In the embodiment of the disclosure, a mounting groove 104d is provided at the bottom of the synchronization slider 101, disposed to correspond to the two notches 104e, and faces an outer side of the two notches 104e. Each of the two notches 104e corresponds to one mounting groove 104d.

Meanwhile, a connection member is disposed in the mounting groove 104d, and fixed on the synchronization slider 101 for fixing other components. In the following embodiments, taking the connection member as a fixing pin 104f for example, for the purpose of description. In the embodiment of the disclosure, an installation direction of the fixing pin 104f is the same as the direction in which the mounting groove 104d is facing. An elastic member 666 may be disposed on the fixing pin 104f. A certain elastic force from the elastic member 666 may be applied on different components, to control the relative motion between different components, and further ensure the bending effect of the foldable display device.

In the embodiment of the disclosure, in the setting of the fixing pin 104f, a length of the fixing pin 104f is greater than a length of the mounting groove 104d, and the fixing pin 104f extends outside the mounting groove 104d in a certain length, so as to ensure the fixing effect of the fixing pin 104f.

In combination with the structure in FIG. 1, in the embodiment of the disclosure, the cam assembly 102 further includes the second cam 1022 at a position corresponding to the mounting groove 104d. The second cam 1022 is disposed to correspond to the first cam 1021. For example, the second cam is disposed on the synchronization slider and faces the inner side wall of the accommodating cavity.

Furthermore, the elastic member 666 is disposed on the fixing pin 104f during the installation process. The elastic member 666 may be a spring, or other elastic members with certain recovery performance. In the following embodiments, the elastic member 666 is described by taking the spring for examples. The elastic member 666 is disposed between the second cam 1022 and the synchronization slider 101.

During the installation process, the second cam 1022 is inserted into the fixing pin 104f in the mounting groove 104d for fixation, and the elastic member 666 is compressed by the second cam 1022. Meanwhile, the first cam 1021 abuts against the second cam 1022. Due to the fact that the elastic member 666 may apply an elastic force on the second cam 1022, and at the same time, the first cam 1021 may apply a pressure on the second cam 1022 in a direction opposite to a direction of the elastic force, so that the first cam 1021 and the second cam 1022 can match when the synchronization slider 101 moves back and forth, that is, the second cam 1022 can move back and forth on the first cam 1021.

Figure 7:
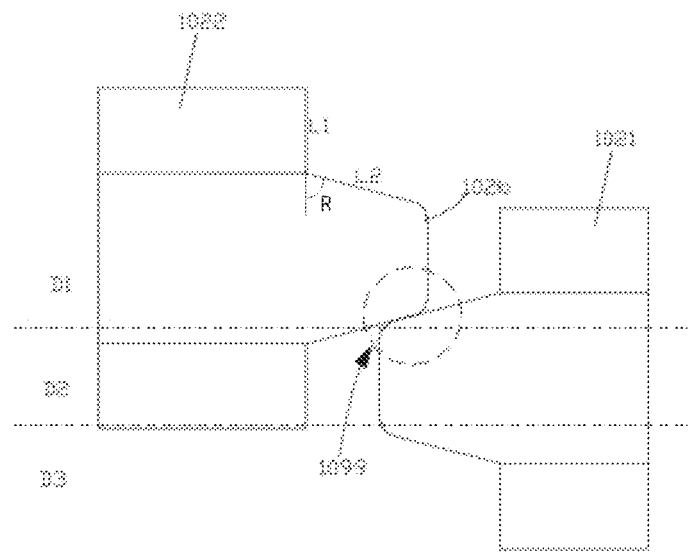
FIG. 7 is a schematic diagram of a first cam and a second cam in a matching state according to an embodiment of the disclosure.
Figure 8:
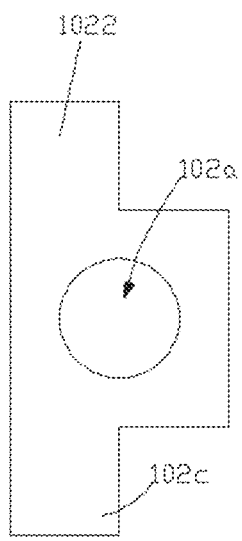
FIG. 8 is a lateral view of a second cam according to an embodiment of the disclosure.

Specifically, as shown in FIG. 7 and FIG. 8. FIG. 7 is a schematic diagram of the first cam and the second cam in a matching state according to the embodiment of the disclosure, and FIG. 8 is a lateral view of the second cam according to the embodiment of the disclosure. In the embodiment of the disclosure, the first cam 1021 and the second cam 1022 form a group of cams in the design. A structure of an outer contour surface of the first cam 1021 is the same as that of the second cam 1022. The first cam 1021 is engaged with the second cam 1022, and the first cam 1021 and the second cam 1022 can slide relatively. Referring to FIG. 7 for details, the design of the first cam 1021 can refer to the structure of the second cam 1022 for setting, which will not be repeated here.

In the embodiment of the disclosure, in the setting of the second cam 1022, the second cam 1022 includes a protrusion part 102b, an aligning part 102c, and an aligning hole 102a. The protrusion part 102b is disposed on the aligning part 102c. The aligning hole 102a is disposed on the aligning part 102c. For example, the aligning hole 102a may be disposed on a side wall of the aligning part 102c. A surface of the protrusion part 102b is a main contact surface of the second cam 1022 during the sliding process. During the installation process, the aligning part 102c is inserted into the mounting groove 104d of the synchronization slider 101, and the aligning hole 102a is aligned with the fixing pin 104f, so that the second cam 1022 can be sleeved on the fixing pin 104f to achieve the installation and the fixation of the second cam 1022.

Specifically, in the embodiment of the disclosure, a climbing angle R of the protrusion part 102b of the second cam 1022 ranges from 35 degrees to 75 degrees to ensure the motion effect of the protrusion part 102b. The climbing angle R is an acute angle formed between an extended plane of the plane L1 where the aligning part 102c is located and an extended plane of a contour surface L2 of the protrusion part 102b. Optionally, the climbing angle R may be 45 degrees, 60 degrees, or designed according to the size of the second cam 1022, which will not be repeated here.

In combination with FIG. 1, at the position where the first cam 1021 abuts against the second cam 1022, a protrusion part of the first cam 1021 correspondingly is in contact with the protrusion part of the second cam 1022. Specifically, an outer contour surface of the protrusion part of the first cam 1021 is in contact with an outer contour surface of the protrusion part of the second cam 1022 to form a contact region 1099. The position of the contact region 1099 may change during the bending process, to achieve the sliding of the second cam 1022 on the outer contour surface of the first cam 1021.

During the sliding process of the second cam 1022, the contact area between the outer contour surface of the second cam 1022 and the outer contour surface of the first cam 1021 may change. For example, when the first fixing piece 103a and the second fixing piece 103b rotate, the contact area of the contact region 1099 between the first cam and the second cam is defined as A1 at a first moment t1, the contact area of the contact region 1099 between the first cam and the second cam is defined as A2 at a second moment t2, and A1 is not equal to A2. If A1<A2, the elastic force of the spring at the first moment is less than the elastic force of the spring at the second moment. For example, the contact region 1099 is a region formed by the side wall of the first cam and the side wall of the second cam at the first moment t1, and the contact region 1099 is a region formed by the top areas of the two cams at the second moment t2. At the second moment, the elastic member 666 is completely compressed by the second cam, resulting in a larger elastic force.

Figure 11:
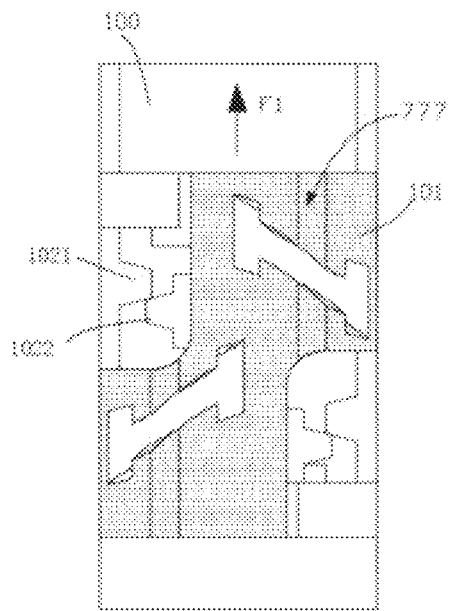
FIG. 11 is a schematic partial assembly diagram of a rotating shaft mechanism according to an embodiment of the disclosure.

As shown in FIG. 11 and FIG. 12, FIG. 11 is a schematic partial assembly diagram of the rotating shaft mechanism according to the embodiment of the disclosure, and FIG. 12 is a schematic three-dimensional diagram of the synchronization slider according to the embodiment of the disclosure. The synchronization slider 101 is assembled in the supporting frame 100, and the first cam 1021 abuts against the second cam 1022. In the embodiment of the disclosure, in the setting of the synchronization slider 101, the synchronization slider 101 also includes a transition slope surface 777, which is correspondingly disposed between the first opening part 1041 and the third opening part 1043 of each of the two sliding guide grooves, and an extension direction of the transition slope surface 777 is the same as the direction of the central axis of the synchronization slider. Heights of surfaces of the synchronization slider at two sides of the transition slope surface 777 are different, providing the avoidance space for the sliding guide rail and the fixing pieces during the rotation process, and further improving the rotation effect and reliability.

With the relative rotation of the first fixing piece and the second fixing piece, such as rotating with an angle ranging from 0 degrees to 90 degrees, the second cam 1022 may move from a side wall of the first cam 1021 to a stepped surface of the protrusion part of the first cam 1021. Due to the fact that the protrusion part of the first cam faces the synchronization slider, the second cam 1022 may move relative to the first cam 1021 in the horizontal direction, causing the elastic member 666 on the fixing pin 104f to be compressed. The elastic force generated by the elastic member 666 may further prevent the motion of the synchronization slider 101 to limit the motion of the synchronization slider. With the continuous relative motion of the cam assembly, the second cam is in contact with different parts of the first cam, making the elastic member generate different elastic forces to achieve automatic folding function. In the embodiment of the disclosure, the spring is used to provide the restored elastic force to the second cam to ensure the rotation effect of the rotating shaft mechanism.

In the embodiment of the disclosure, during the rotation and the bending process, due to the presence of the block 100a disposed at a side of the first cam, when the second cam 1022 crosses the stepped surface of the protrusion part of the first cam 1021, it may be blocked by the block 100a, stopping the rotation of the second cam 1022 to ultimately complete the rotation of the rotating shaft mechanism.

Furthermore, as shown in FIG. 7, in the embodiment of the disclosure, a cam overlapping value of the first cam 1021 and the second cam 1022 in the cam assembly 102 corresponding to the contact region 1099 may range from 0.15 mm to 0.6 mm, to ensure the contact effect between the first cam 1021 and the second cam 1022, and further improve the rotation effect of the rotating shaft mechanism. The cam overlapping value is a length of parts where the outer contour surface of the first cam and the outer contour surface of the second cam fit. Optionally, the cam overlapping value of the first cam 1021 and the second cam 1022 may be 0.3 mm, 0.4 mm, 0.5 mm, or adjusted according to actual needs of different products, to ensure the relative motion effect of the cam assembly, and achieve the rotation effect of the rotating shaft mechanism in the embodiment of the disclosure.

Figure 9:
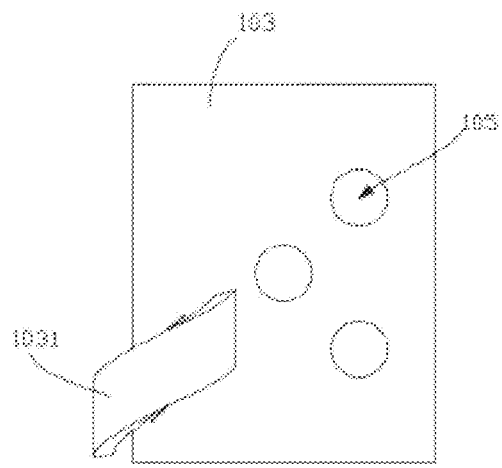
FIG. 9 is a schematic structural diagram of a fixing piece according to an embodiment of the disclosure.
Figure 10A:
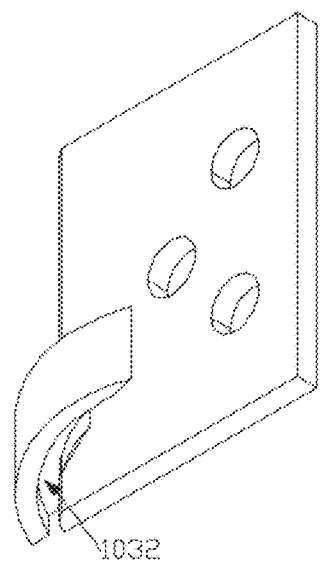
FIG. 10A is another schematic structural diagram of a fixing piece according to an embodiment of the disclosure.
Figure 10B:
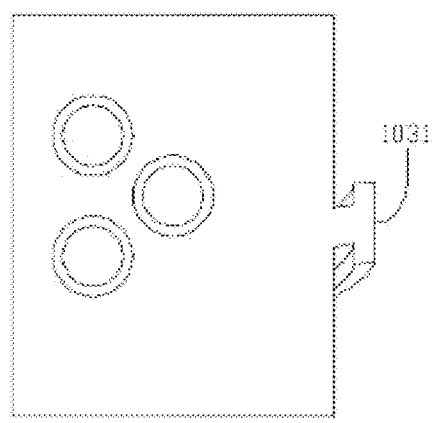
FIG. 10B is another schematic structural diagram of a fixing piece according to an embodiment of the disclosure.

Furthermore, as shown in FIG. 9, FIG. 10A, and FIG. 10B, FIG. 9 is a schematic structural diagram of the fixing piece according to the embodiment of the disclosure, FIG. 10A is another schematic structural diagram of the fixing piece according to the embodiment of the disclosure, and FIG. 10B is another schematic structural diagram of the fixing piece according to the embodiment of the disclosure. FIG. 9 illustrates a schematic diagram of a back part of the fixing piece, FIG. 10A illustrates a lateral view of the fixing piece, and FIG. 10B illustrates a schematic front view of the fixing piece.

In combination with the structures of each component in FIGS. 1 to FIG. 8, in the embodiment of the disclosure, each of the two fixing pieces 103 is provided with at least one sliding guide rail 1031 and screw holes 105 disposed on a surface of each of the two fixing pieces 103. Specifically, in the setting of the sliding guide rail 1031, the sliding guide rail 1031 is disposed along a side surface of each of the two fixing pieces 103 and spirally extends towards the middle part of each of the two fixing pieces.

Specifically, an end of the sliding guide rail 1031 is disposed at a position corresponding to the side surface of each of the two fixing pieces 103, another end of the sliding guide rail 1031 is disposed at a position corresponding to the middle part of the bottom of each of the two fixing pieces 103, and the two ends of the sliding guide rail 1031 are fixed on each of the two fixing pieces 103. The sliding guide rail 1031 may be designed to be a spiral guide rail.

Furthermore, in combination with the structure of the synchronization slider illustrated in FIG. 6, the sliding guide rail 1031 disposed on each of the two fixing pieces 103 is clamped in corresponding one of the two sliding guide grooves 104 during the assembly process, and can move in corresponding one of the two sliding guide grooves 104 during the rotation of the rotating shaft mechanism. In the embodiment of the disclosure, the sliding guide rail 1031 further includes a clamping groove 1032 to match corresponding one of the two sliding guide grooves 104. The side edge of each of the two sliding guide grooves 104 corresponds to the clamping groove 1032 of the sliding guide rail 1031, enabling each of the two sliding guide grooves 104 matching the sliding guide rail 1031, and further preventing the sliding guide rail 1031 from shaking and unsatisfactory rotation effect during the sliding process.

In the embodiment of the disclosure, due to the correspondence between each of the two sliding guide grooves 104 and the sliding guide rail 1031, the sliding guide rail 1031 may be designed as a spiral guide rail to ensure a good match between the two and ensure the sliding effect during the sliding process. A specific structure and parameters of the spiral guide rail may be designed with reference to the structure of the sliding guide grooves according to the embodiment of the disclosure, and will not be repeated here.

In combination with the assembly structures illustrated in FIG. 1 and FIG. 11, in the embodiment of the disclosure, the sliding guide rail 1031 is correspondingly disposed in each of the two sliding guide grooves 104. When the first fixing piece and the second fixing piece rotate relative to the synchronous slide 101, the two fixing pieces 103 can drive the corresponding sliding guide rail 1031 to move, then, the sliding guide rail 1031 spirally moves in corresponding one of the two sliding guide grooves 104. When the two fixing pieces 103 move relative to the synchronous slide 101, the sliding guide rail provides driving force to the synchronization slider, causing the synchronization slider to move in the accommodating cavity in a direction parallel to the axis of the supporting frame, and driving the cam assembly disposed on the synchronization slider to slide on the cam assembly disposed on the supporting frame. Specifically, the sliding guide rail 1031 spirally moves along corresponding one of the two sliding guide grooves 104, providing a lateral thrust force for the synchronization slider 101, and a direction of the lateral thrust force is parallel to the axis of the supporting frame. Furthermore, the second cam may simultaneously move on the first cam during the spiral motion of the sliding guide rail 1031, so as to apply forces on the synchronization slider 101 from different directions, and control the rotation effect of the rotating shaft mechanism.

Figure 13:
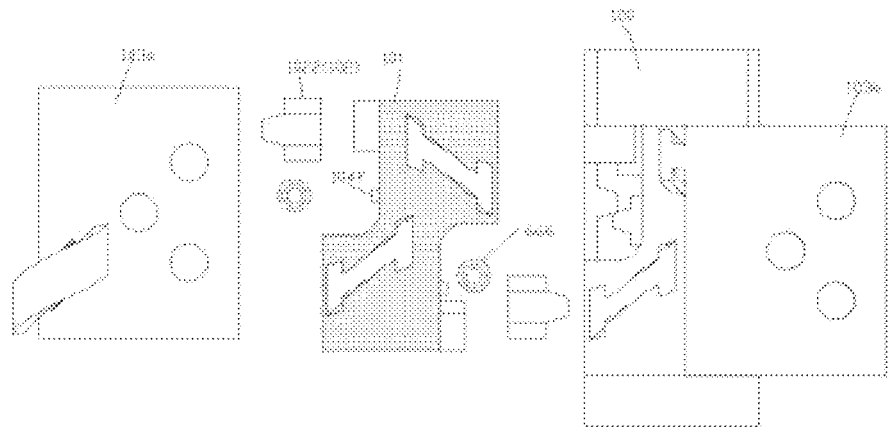
FIG. 13 is a schematic explosion diagram of a rotating shaft mechanism according to an embodiment of the disclosure.

As shown in FIG. 13, it is a schematic explosion diagram of the rotating shaft mechanism according to the embodiment of the disclosure. In combination with the structural diagrams of other components of the rotating shaft mechanism in the disclosure, during the assembly process of the components, the supporting frame 100, the synchronization slider 101, and the two fixing pieces 103 are sequentially installed at corresponding positions; the cam assembly 102 and the elastic member 666 corresponding to the synchronization slider 101 are installed and fixed, then, the sliding guide rail disposed on each of the two fixing pieces 103 is installed with corresponding one of the two sliding guide grooves in the synchronization slider 101, ultimately forming the rotating shaft mechanism of the embodiment of the disclosure. At the same time, during the assembly process of the foldable display device, a display panel is disposed on the rotating shaft mechanism, such as on the two fixing pieces 103. The display panel can be bent during the relative rotation process of the two fixing pieces 103, achieving the bending effect and the folding effect of the display panel.

Figure 14:
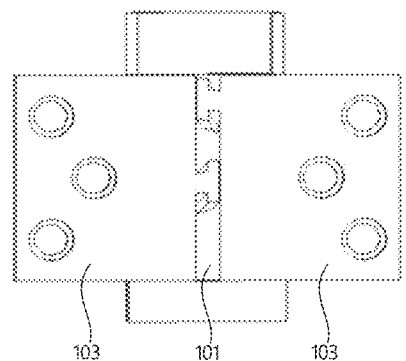
FIG. 14 is a schematic structural diagram of a rotating shaft mechanism at an angle of 0 degrees according to an embodiment of the disclosure.
Figure 15:
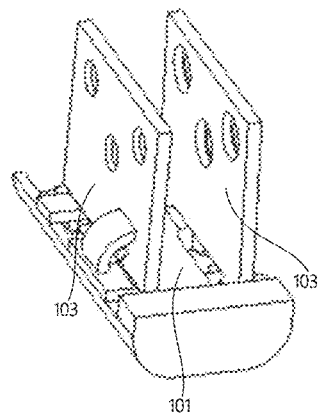
FIG. 15 is a schematic structural diagram of a rotating shaft mechanism at an angle of 90 degrees according to an embodiment of the disclosure.
Figure 16:
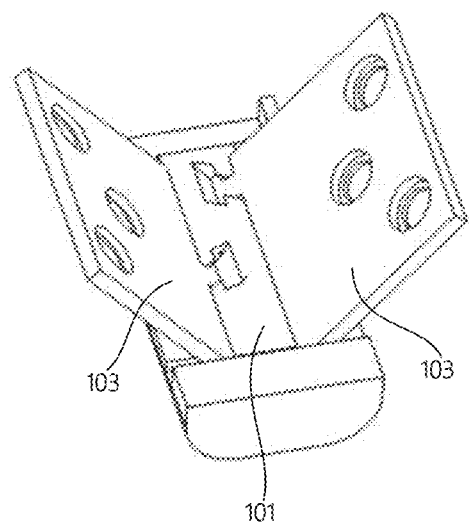
FIG. 16 is a schematic structural diagram of a rotating shaft mechanism at an angle ranging from 0 degrees to 90 degrees according to an embodiment of the disclosure.

Furthermore, referring to FIG. 14, FIG. 15, and FIG. 16, FIG. 14 is a schematic structural diagram of the rotating shaft mechanism at an angle of 0 degrees according to the embodiment of the disclosure, FIG. 15 is a schematic structural diagram of the rotating shaft mechanism at an angle of 90 degrees according to the embodiment of the disclosure, and FIG. 16 is a schematic structural diagram of the rotating shaft mechanism at an angle ranging from 0 degrees to 90 degrees according to the embodiment of the disclosure.

Based on the above description of the rotation process, in the embodiment of the disclosure, as shown in FIG. 14, the two fixing pieces 103 are in a horizontal state at the angle of 0 degrees, correspondingly, the display panel may be in a horizontal unfolding state. In combination with the matching relationship between the first cam 1021 and the second cam 1022 illustrated in FIG. 7 and the installation structure illustrated in FIG. 1, as the rotating shaft mechanism rotates, a length of the sliding guide rail that extends into corresponding one of the two sliding guide grooves may increase. At the angle of 0 degrees, an end of the sliding guide rail is disposed in the third opening part 1043, that is, only a part of the sliding guide rail is located in corresponding one of the two sliding guide grooves. At this moment, the first cam 1021 is in contact with the second cam 1022, the spring in the synchronization slider 101 is not compressed or slightly compressed, and the second cam 1022 is located on a side wall of the protrusion part of the first cam in a first region D1 of the first cam. As the two fixing pieces 103 rotate, the second cam 1022 may slide from the first region D1 into a second region D2 of the first cam, and into a third region D3 of the first cam. The sliding guide rail on each of the two fixing pieces 103 may rotate in corresponding one of the two sliding guide grooves of the synchronization slider. Meanwhile, the two fixing pieces 103 may apply an upward or downward driving force on the synchronization slider 101 during the rotation process, making the synchronization slider 101 move along its axis.

Referring to FIG. 16 for details, as the rotation continues, the second cam slides from the first region D1 into the second region D2, the angle formed between the two fixing pieces 103 and the surface of the synchronization slider increases. Specifically, the above-mentioned angle may increase from 0 degrees to 90 degrees. As the rotation further continues, the second cam continues to slide from the second region D2 into the third region D3. When sliding into the third region D3, the angle formed between the two fixing pieces 103 and the surface of the synchronization slider may be 90 degrees, as illustrated in FIG. 15, or greater than 90 degrees. Correspondingly, the second cam slides onto the top surface of the first cam at the angle of 90 degrees. When the rotating shaft mechanism rotates continuously, due to the presence of the limiting member disposed on two ends of the synchronization slider, the rotating shaft mechanism may rotate to the maximum position and then stop. When the rotating shaft mechanism returns to rotate, the second cam rotates from the third region D3 into the first region D1, and the action state reversely changes, which will not be repeated here.

In the embodiment of the disclosure, during the motion of the synchronization slider 101, both of the contact area and the contact position between the first cam 1021 and the second cam 1022 may change, and the forces they bear also vary depending on different contact positions and contact areas. Meanwhile, the first cam 1021 may further apply a lateral resistance on the synchronization slider 101 to compress the spring in the synchronization slider 101, so that the elastic forces from the spring may prevent the motion of the synchronization slider 101, and the rotating shaft mechanism can realize the rotation function and the automatic folding function with the changes of the elastic forces and the rotation of the rotating shaft. Furthermore, when the above-mentioned motions repeat multiple times, the synchronization slider can slide back and forth in the supporting frame, and achieve the rotation and the folding of the rotating shaft mechanism.

In the embodiment of the disclosure, the sliding guide rail can slide in the sliding guide groove, and the cam assembly further affects the motion of various components during the rotation of the rotating shaft mechanism, thereby improving the rotation effect of the rotating shaft mechanism. Furthermore, in the embodiment of the disclosure, the combined action of the synchronization slider and cam assembly effectively improves the comprehensive performance of the foldable display device.

Figure 17:
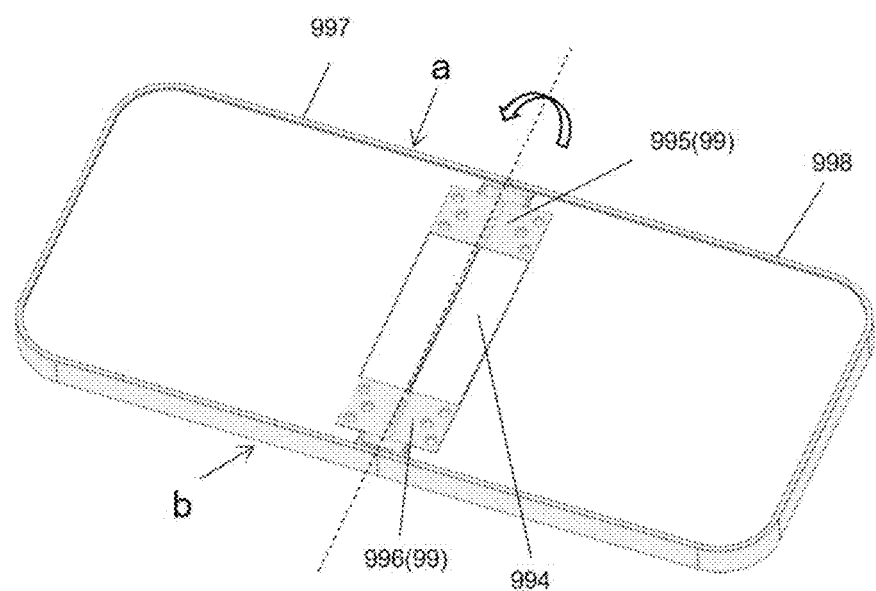
FIG. 17 is a first schematic structural diagram of a foldable display device according to an embodiment of the disclosure.
Figure 18:
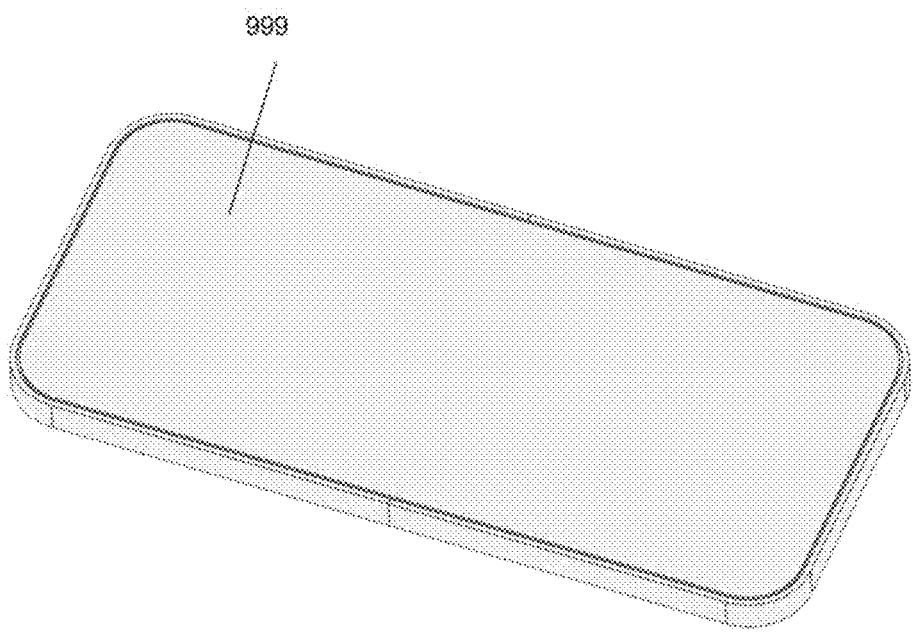
FIG. 18 is a second schematic structural diagram of a foldable display device according to an embodiment of the disclosure.

Furthermore, embodiments of the disclosure further provide a foldable display device. Referring to FIG. 17 and FIG. 18, FIG. 17 is a first schematic structural diagram of the foldable display device according an embodiment of the disclosure, and FIG. 18 is a second schematic structural diagram of the foldable display device according the embodiment of the disclosure. In combination with the above-mentioned rotating shaft mechanism, in the embodiment of the disclosure, the foldable display device includes a first middle frame 997, a second middle frame 998, a rotating shaft mechanism 99, a supporting plate 994, and a flexible display panel 999, and the rotating shaft mechanism 99.

Specifically, the first middle frame 997 is disposed at a side of the second middle frame 998, the rotating shaft mechanism 99 is disposed between the first middle frame 997 and the second middle frame 998, and the first middle frame 997 is connected to the second middle frame 998 through the rotating shaft mechanism 99, to achieve the rotation of the first middle frame 997 relative to the second middle frame 998 when the foldable display device is folded.

Furthermore, the rotating shaft mechanism 99 may include a first rotating shaft mechanism 995 and a second rotating shaft mechanism 996. The first rotating shaft mechanism 995 is disposed opposite to the second rotating shaft mechanism 996. For example, the first rotating shaft mechanism 995 and the second rotating shaft mechanism 996 may be disposed at two opposite sides. Specifically, the first rotating shaft mechanism 995 is correspondingly connected to one side (a) of the first middle frame 997 and the second middle frame 998, and the second rotating shaft mechanism 996 is correspondingly connected to another side (b) of the first middle frame 997 and the second middle frame 998.

Referring to FIG. 17 and FIG. 18 for details. The foldable display device further includes a supporting plate 994 and a flexible display panel 999. The supporting plate 994 is disposed between the first rotating shaft mechanism 995 and the second rotating shaft mechanism 996. Two sides of the supporting plate 994 are correspondingly connected to the two fixing pieces 103 of the rotating shaft mechanism. When the two fixing pieces 103 roll and rotate, they may drive the supporting plate 994 to rotate. In the embodiment of the disclosure, the supporting plate 994 can fill and level up the suspended area between the first rotating shaft mechanism 995 and the second rotating shaft mechanism 996, and play a supporting role.

The flexible display panel 999 is disposed on the supporting plate 994, and covers the first middle frame 997, the second middle frame 998, the rotating shaft mechanism 99, and the supporting plate 994. When the foldable display device is folded, the first middle frame 997 rotates towards a side of the second middle frame 998 through the rotating shaft mechanism 99, and drives the flexible display panel to bend, ultimately achieving the folding and the unfolding of the flexible display panel 999.

Furthermore, the foldable display device may be any foldable or touch operated product or component such as a mobile phone, a computer, an electronic paper, a monitor, a laptop, a digital photo frame, or the like. The specific types are not limited here.

Based on the above, the rotating shaft mechanism and the foldable display device according to the embodiments of the disclosure are described in detail. In this paper, specific embodiments are adopted to illustrate a principle and implementation modes of the disclosure. The description of the above-mentioned embodiments is only used to help understand methods and a core idea of the disclosure. At the same time, for those skilled in the art, according to the idea of the disclosure, there will be changes in specific implementation modes and a scope of the disclosure. In conclusion, contents of the specification should not be interpreted as a limitation of the disclosure.

What is claimed is:

1. A rotating shaft mechanism, comprising:
   a supporting frame, wherein an accommodating cavity is disposed in the supporting frame;
   a synchronization slider slidably disposed in the accommodating cavity;
   a fixing piece rotatably connected to the synchronization slider; and
   a cam assembly comprising a first cam and a second cam, wherein the first cam is disposed on the supporting frame and the second cam is disposed on the synchronization slider;
   wherein the fixing piece is configured to provide a driving force for the synchronous slider, enabling the synchronization slider to slide in the accommodating cavity in a direction parallel to an axis of the supporting frame, and driving the second cam disposed on the synchronization slider to slide on the first cam disposed on the supporting frame; and
   wherein the first cam is correspondingly disposed on an inner side wall of the accommodating cavity and faces the synchronization slider; and wherein the second cam is disposed on the synchronization slider and faces the inner side wall of the accommodating cavity, and both of a climbing angle at a position where a protrusion part of the first cam is located and a climbing angle at a position where a protrusion part of the second cam is located range from 35 degrees to 75 degrees.

2. The rotating shaft mechanism of claim 1, wherein an outer contour surface of the first cam is in contact with an outer contour surface of the second cam, and when the rotating shaft mechanism rotates, the second cam slides on the outer profile surface of the first cam.

3. A rotating shaft mechanism, comprising:
a supporting frame, wherein an accommodating cavity is disposed in the supporting frame;
a synchronization slider slidably disposed in the accommodating cavity;
a fixing piece rotatably connected to the synchronization slider; and
a cam assembly comprising a first cam and a second cam, wherein the first cam is disposed on the supporting frame and the second cam is disposed on the synchronization slider;
wherein the fixing piece is configured to provide a driving force for the synchronous slider, enabling the synchronization slider to slide in the accommodating cavity in a direction parallel to an axis of the supporting frame, and driving the second cam disposed on the synchronization slider to slide on the first cam disposed on the supporting frame.

4. The rotating shaft mechanism of claim 3,
wherein the first cam is correspondingly disposed on an inner side wall of the accommodating cavity and faces the synchronization slider, and the second cam is disposed on the synchronization slider and faces the inner side wall of the accommodating cavity.

5. The rotating shaft mechanism of claim 4, wherein the second cam comprises a protrusion part, an aligning part, and an aligning hole; and
wherein the protrusion part is disposed on the aligning part, and the aligning hole is disposed on a side wall of the aligning part.

6. The rotating shaft mechanism of claim 5, wherein a protrusion part of the first cam is contact with the protrusion part of the second cam, and the protrusion part of the first cam and the protrusion part of the second cam form a contact area; and
wherein during a process of the rotating shaft mechanism rotating from a first moment to a second moment, an area of the contact area at the first moment is different from an area of the contact area at the second moment.

7. The rotating shaft mechanism of claim 4, wherein an outer contour surface of the first cam is in contact with an outer contour surface of the second cam, and when the rotating shaft mechanism rotates, the second cam slides on the outer contour surface of the first cam.

8. The rotating shaft mechanism of claim 4, wherein the synchronization slider is further provided with a mounting groove, and a connection member is disposed in the mounting groove; and
wherein the second cam is correspondingly disposed on the connection member, and a protrusion part of the second cam faces the first cam.

9. The rotating shaft mechanism of claim 8, wherein the synchronization slider further comprises an elastic member disposed on the connection member and used to provide a recovery elastic force for the second cam.

10. The rotating shaft mechanism of claim 4, wherein the synchronization slider further comprises at least one notch; wherein the first cam is correspondingly disposed in the notch; and wherein a width of the notch is greater than a height of the first cam in a direction parallel to a top of the first cam.

11. The rotating shaft mechanism of claim 3, wherein the synchronization slider further comprises a sliding guide groove; wherein the sliding guide groove comprises a first sliding guide groove and a second sliding guide groove; and wherein a sliding guide rail is disposed on the fixing piece; and
wherein the sliding guide rail is disposed in the sliding guide groove in a rotating form, and configured to provide a driving force for the synchronous slider during a rotation process.

12. The rotating shaft mechanism of claim 11, wherein a first included angle is formed between an extension direction of a central axis of the first sliding guide groove and an extension direction of a central axis of the synchronization slider, and a second included angle is formed between an extension direction of a central axis of the second sliding guide groove and the extension direction of the central axis of the synchronization slider; and
wherein both of the first included angle and the second included angle range from 40 degrees to 50 degrees.

13. The rotating shaft mechanism of claim 11, wherein the sliding guide groove comprises a first opening part, a second opening part, and a third opening part; and
wherein the first opening part is disposed close to an edge of the synchronization slider, and the second opening part is disposed between the first opening part and the third opening part.

14. The rotating shaft mechanism of claim 13, wherein both of an opening width of the first opening part and an opening width of the third opening part are greater than an opening width of the second opening part.

15. The rotating shaft mechanism of claim 13, wherein when the rotating shaft mechanism is in a flattened state, an end of the sliding guide rail away from an edge of the synchronization slider is disposed in the third opening part of the sliding guide groove, and the second cam is disposed on a side wall of a protrusion part of the first cam.

16. The rotating shaft mechanism of claim 11, wherein both of the sliding guide groove and the sliding guide rail are provided in a spiral form, and the sliding guide rail is slidably disposed in the sliding guide groove; and wherein when the rotating shaft mechanism rotates, the sliding guide rail slides in the sliding guide groove and drives the synchronization slider to move along an axis of the supporting frame.

17. The rotating shaft mechanism of claim 16, wherein a spiral angle of the sliding guide rail ranges from 30 degrees to 60 degrees.

18. The rotating shaft mechanism of claim 3, wherein a sliding guide rail is disposed on the fixing piece, and wherein the sliding guide rail is disposed from a side surface of the fixing piece to a position where a central axis of the fixing piece is located in a width direction.

19. A foldable display device, comprising:
a first middle frame;
a second middle frame disposed at a side of the first middle frame;
a rotating shaft mechanism disposed between the first frame and the second middle frame, wherein the first frame is connected to the second middle frame through the rotating shaft mechanism; wherein the rotating shaft mechanism comprises:
a supporting frame, wherein an accommodating cavity is disposed in the supporting frame;

a synchronization slider slidably disposed in the accommodating cavity;

a fixing piece rotatably connected to the synchronization slider; and a cam assembly comprising a first cam and a second cam, wherein the first cam is disposed on the supporting frame and the second cam is disposed on the synchronization slider;

wherein the fixing piece is configured to provide a driving force for the synchronous slider, enabling the synchronization slider to slide in the accommodating cavity in a direction parallel to an axis of the supporting frame, and driving the second cam disposed on the synchronization slider to slide on the first cam disposed on the supporting frame; and a flexible display panel covering the first middle frame, the second middle frame, and the rotating shaft mechanism.

20. The foldable display device of claim 19, wherein the rotating shaft mechanism comprises a first rotating shaft mechanism and a second rotating shaft mechanism; wherein the first rotating shaft mechanism is connected to a first side of the first middle frame and the second middle frame at a same side as the first rotating shaft mechanism, and the second rotating shaft mechanism is connected to a second side of the first middle frame and the second middle frame, and the second side is disposed opposite to the first side; and wherein the foldable display device further comprises a supporting plate disposed between the first rotating shaft mechanism and the second rotating shaft mechanism, and the flexible display panel is disposed on the supporting plate.

\* \* \* \* \*